United States Patent [19]

Kondou et al.

[11] Patent Number: 5,688,055

[45] Date of Patent: Nov. 18, 1997

[54] STUD TYPE BEARING WITH GEAR

[75] Inventors: Akihiro Kondou, Saitama; Katsuaki Sakou, Gifu, both of Japan

[73] Assignee: Nippon Thompson Co., Ltd., Tokyo, Japan

[21] Appl. No.: 603,893

[22] Filed: Feb. 22, 1996

[30] Foreign Application Priority Data

Feb. 24, 1995 [JP] Japan .................................. 7-061868

[51] Int. Cl.$^6$ .................................................. F16C 19/04
[52] U.S. Cl. .................................................. 384/449
[58] Field of Search .................................. 384/449, 130, 384/484, 569, 548, 550

[56] References Cited

U.S. PATENT DOCUMENTS

| 4,491,037 | 1/1985 | Bullock | 384/130 |
| 5,286,115 | 2/1994 | Toji et al. | 384/449 |

*Primary Examiner*—Lenard A. Footland
*Attorney, Agent, or Firm*—Sughrue,Mion,Zinn,Macpeak & Seas, PLLC

[57] ABSTRACT

A stud type bearing including an outer ring having a gear portion on its outer circumference, the outer ring being rotatably supported on the free end of a shaft member by rolling elements. The outer ring is held axially between a flange at the free end of the shaft member on one side of the outer ring and a side plate fitted over the shaft member at the other side of the outer ring. A lubricant feed hole is formed in the free end of the shaft member and in the outer ring for providing lubricant to the rolling elements and the gear portion. A fitting portion is formed in the free end of the shaft member for accepting a fastening tool for fastening the shaft member to another structure.

15 Claims, 10 Drawing Sheets

Fig.1

PRIOR ART

STUD TYPE BEARING WITH GEAR

BACKGROUND OF THE INVENTION

1. Field of the Invention

The present invention relates to a stud type bearing with gear that is suitable for use as, for example, an idle gear.

2. Description of the Prior Art

Figure 1:
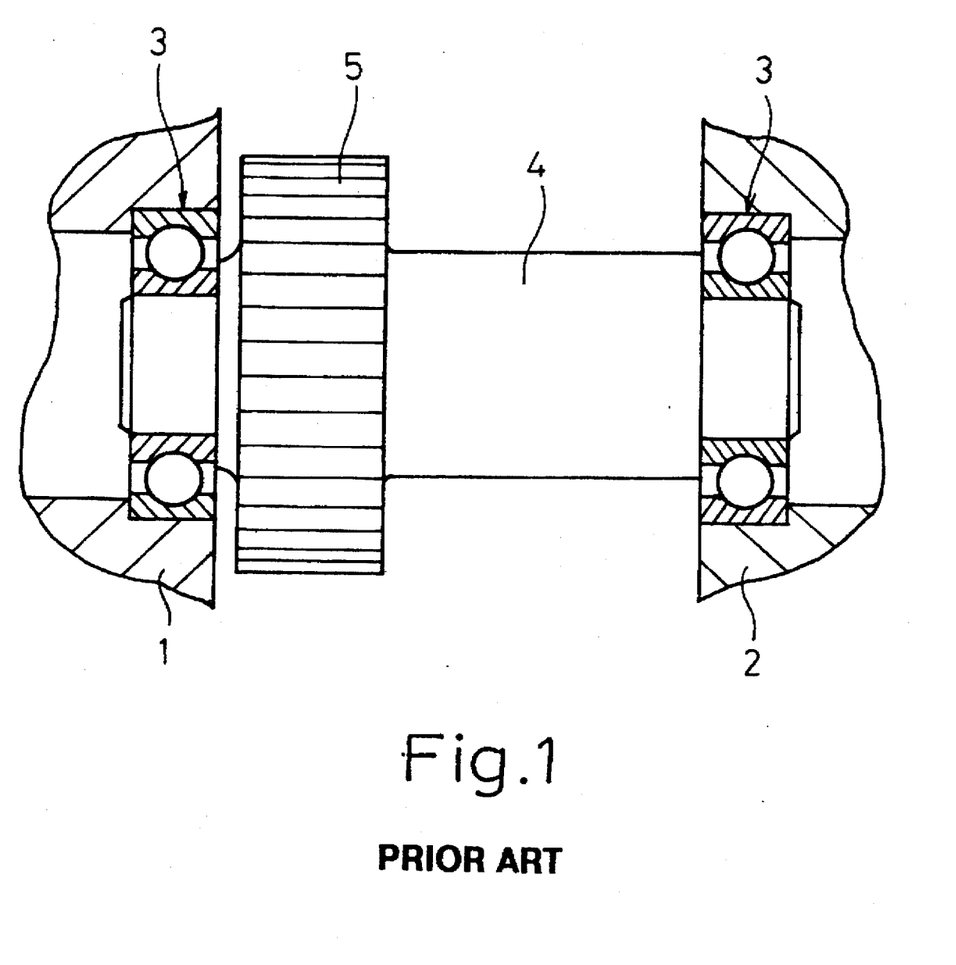
FIG. 1 is a cross-sectional view showing a constitution relating to an idle gear and its bearing of the prior art.

FIG. 1 shows a constitution relating to an idle gear and its bearing of the prior art. As shown in the drawing, shaft member 4 is attached to casings 1 and 2 at both of its ends while allowing to rotate freely by means of ball bearings 3, and idle gear 5 is provided on this shaft member 4.

In the above-mentioned constitution, the above-mentioned shaft member 4 is supported on both ends and a plurality of ball bearings 3 are required, and it is difficult to reduce the size and weight of said mechanism and an apparatus using a large number of said mechanisms, when incorporating said mechanism as a part of an apparatus such as a machine tool and so forth. There is also a disadvantage of handling such as having to assemble above-mentioned shaft member 4 and both ball bearings 103 in advance. In addition, since the idle gear 5, shaft member 4 and each ball bearing 3 have to individually be made available and then mutually assembled, in addition to the cost required for each of said parts, a considerable amount of labor is required for mutual assembly, thereby resulting in the problem of high manufacturing cost.

SUMMARY OF THE INVENTION

In consideration of the above-mentioned problems of the prior art, the object of the present invention is to provide a constitution that simultaneous to solving each of the above-mentioned problems, also offers various other advantages.

The stud type bearing with gear according to the present invention is equipped with an outer ring provided with a track on the inside and having a gear portion formed on the outside, a shaft member inserted into said outer ring, having a flange portion that engages with one side of said outer ring formed on one end, and a track formed in the vicinity of said other end so as to correspond with the track of said outer ring, a plurality of rolling elements arranged between said tracks that roll accompanying rotation of said outer ring, and a side plate fit on the outside of said shaft member and provided so as to engage with the other side of said outer ring that operates in concert with said flange portion and holds said outer ring on said shaft member.

In addition, the stud type bearing with gear according to the present invention is equipped with an outer ring provided with a track on the inside and having a plurality of gear portions formed on the outside, a shaft member inserted into said outer ring, having a flange portion that engages with one side of said outer ring formed on one end, and a track formed in the vicinity of said one end so as to correspond with the track of said outer ring, a plurality of rolling elements arranged corresponding to each of said plurality of gear portions between said tracks that roll accompanying rotation of said outer ring, and a side plate fit on the outside of said shaft member and provided so as to engage with the other side end of said outer ring that operates in concert with said flange portion and holds said outer ring on said shaft member.

In the above-mentioned constitution, the above-mentioned outer ring is rotated by driving force applied by a gear on the drive side that meshes with the above-mentioned gear portion, and the above-mentioned rolling elements roll accompanying this rotation.

2

DESCRIPTION OF THE PREFERRED EMBODIMENTS

The following provides an explanation of embodiments of the present invention while referring to the attached drawings.

Figure 2:
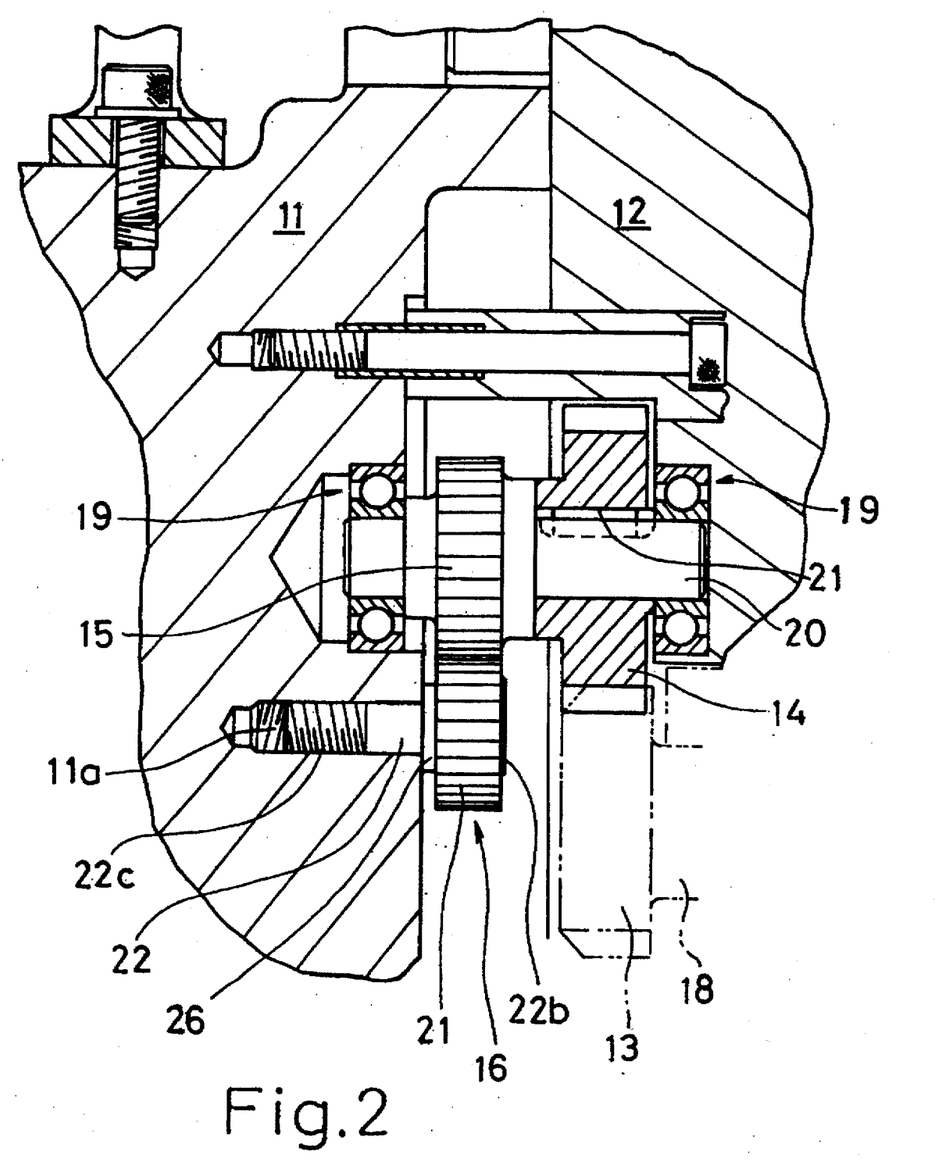
FIG. 2 is a cross-sectional view showing a portion of a motive power transmission mechanism in a multi shaft drilling machine equipped with the stud type bearing with gear as a first embodiment of the present invention.

FIG. 2 is a cross-sectional view of a portion of a motive force transmission mechanism in a multishaft drilling machine equipped with a stud type bearing with gear as a first embodiment of the present invention. As shown in said drawing, said multishaft drilling machine is equipped with bases 11 and 12, and drive gear 13, driven gear 14, transmission gear 15 and idle gear 16 are provided within the space demarcated by both said bases.

The above-mentioned drive gear 13 is fastened on the end of spindle 18 and is rotated and driven together with said spindle 18 by torque applied by a driving device which is not shown. In addition, driven gear 14 meshes with said drive gear 13, and rotates accompanying rotation of said drive gear 13. More specifically, said driven gear 14 is fastened using gear 21 to spindle 20 mounted at both ends by means of a pair of ball bearings 19 to both the above-mentioned bases 11 and 12.

The above-mentioned transmission gear 15 is formed into a single unit with the above-mentioned spindle 20, and therefore rotates in synchronization with the above-mentioned driven gear 14. Idle gear 16 meshes in plurality (although not shown as such) with this transmission gear 15, and is rotated and driven by torque transmitted by said transmission gear 15. Moreover, although not shown in the drawing, the gear of a drill spindle meshes with said idle gear 16 and is output.

The stud type bearing with gear as claimed in the present invention is used as the above-mentioned idle gear 16. The following provides an explanation of the details of its constitution.

Figure 3:
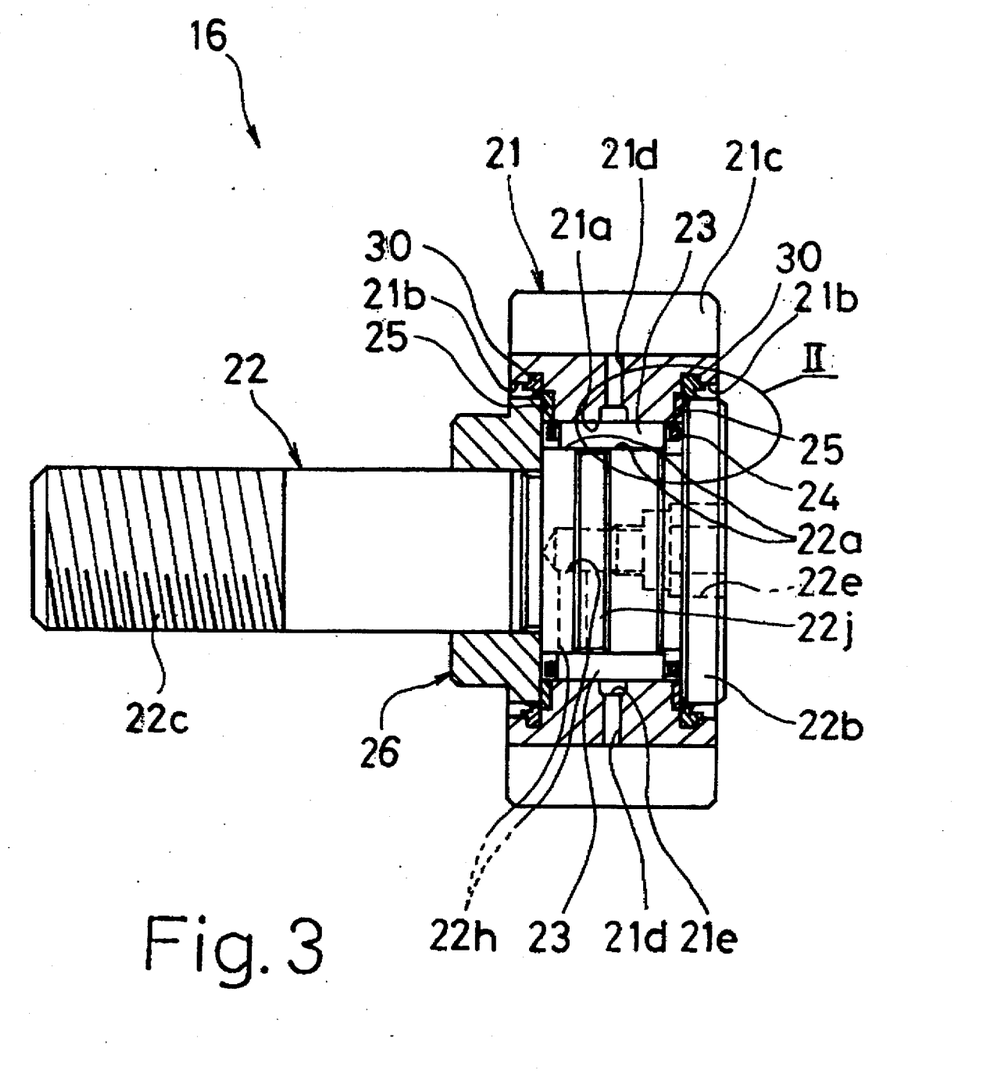
FIG. 3 is a cross-sectional view of a stud type bearing with gear as a first embodiment of the present invention.

As shown in FIG. 3, stud type bearing with gear in the form of idle gear 16 has outer ring 21, shaft member 22 inserted into said outer ring 21, a plurality of rolling elements in the form of rollers 23 juxtapositioned between outer ring 21 and shaft member 22, cage 24 that holds each of said rollers 23 at mutually equal intervals, thrust washer 25 and side plate 26 that holds outer ring 21 on shaft member 22.

The cross-section of the above-mentioned outer ring is thick walled, and a track in the form of track surface 21a is formed in its inside. Ledges 21b are formed on both edges having a diameter larger than the diameter of said track surface 21a. Moreover, gear portion 21c is formed on the outside. The bottom surfaces of said track surface 21a and gear portion 21c are connected by connecting hole 21d that passes through the center in the direction of width of the outer ring in the form of an oil flow path. In addition, groove 21e for retention of lubricant is formed in said track surface 21a over the entire circumference of said track surface 21a, and said groove 21e is continuous with the above-mentioned connecting hole 21d.

On the other hand, a track in the form of track surface 22a is formed near one end of shaft member 22 corresponding to track surface 21a of outer ring 21. Flange portion 22b is formed in said one end having a diameter slightly smaller than that of ledge portion 21b of said one side of outer ring 21, while male threaded portion 22c is provided on the other side for engaging with female threaded portion 11a formed in the above-mentioned base 11. Furthermore, the above-mentioned rollers 23 are arranged between track surface 22a of said shaft member 22 and track surface 21a of the above-mentioned outer ring 21, and roll accompanying rotation of outer ring 21.

Figure 4:
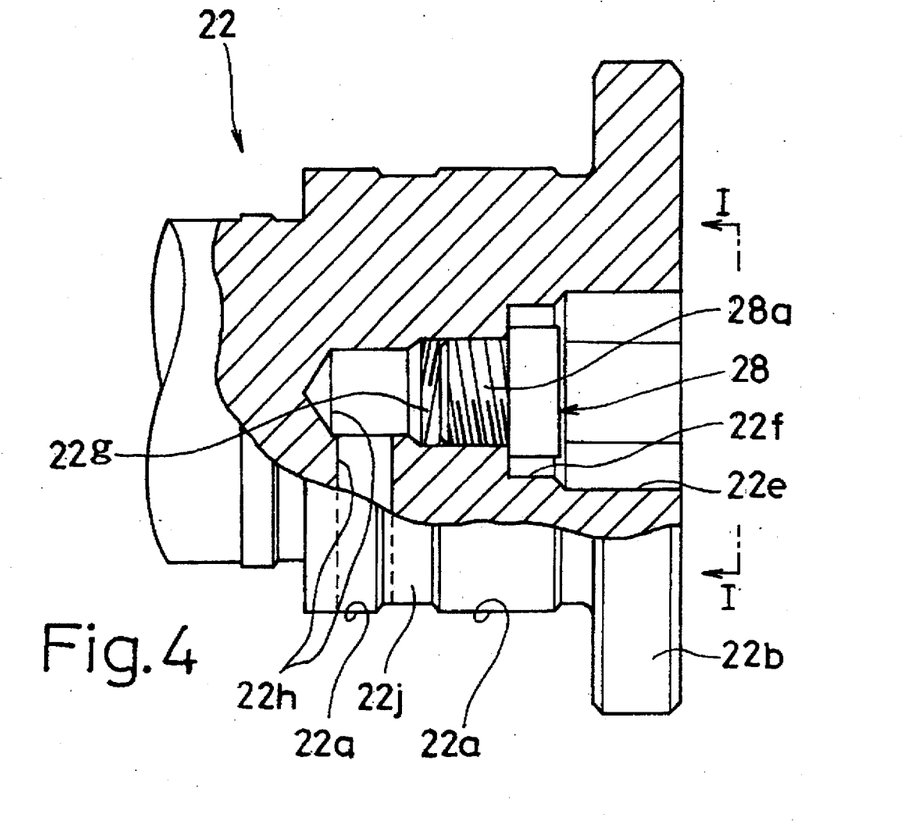
FIG. 4 is a front view, including a partial cross-section, of a portion of a shaft member equipped on the stud type bearing with gear shown in FIG. 3.
Figure 5:
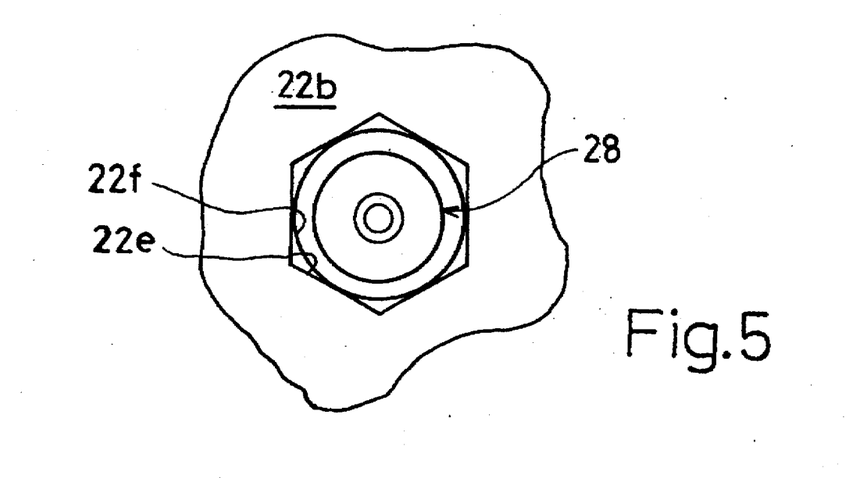
FIG. 5 is a perspective view taken along arrows I—I relating to FIG. 4.

As is clear from FIGS. 4 and 5, fitting hole 22e having a hexagonal cross-section that is able to engage with a fastening tool in the form of a hexagon wrench (not shown) is formed in the one end of shaft member 22 on which the above-mentioned flange portion 22b is provided. Namely, as was previously described, in said idle gear 16, male threaded portion 22c is formed on the stationary end of shaft member 22, and attachment is completed simply by engaging said male threaded portion 22c with female threaded portion 21a formed in base 11 as shown in FIG. 2. Thus, attachment work can be performed both simply and rapidly. The above-mentioned fitting hole 22e is to be used during this attachment work. As a result of providing said fitting hole 22e that is able to fit together with a fastening tool, there is no need to make available special tools or jigs and so forth when fastening idle gear 16 onto base 11, thus enabling attachment to be performed with only ordinary fastening tools like the above-mentioned hexagon wrench.

Furthermore, although the above-mentioned hexagon wrench is used for the fastening tool, and fitting hole 22e is formed in shaft member 22 in the form of a fitting portion that is able to fit with said hexagon wrench in the present embodiment, conversely a projection may be formed having a hexagonal cross-section, and attachment may be performed using an ordinary spanner and so forth. In addition, the shape of the cross-section of the above-mentioned fitting hole 22e may also be changed so as to fit with a plus or minus screwdriver.

Moreover, although female threaded portion 11a is formed in base 11, male threaded portion 22c is formed in shaft member 22, and both are made to engage in the present embodiment as shown in FIG. 2, conversely a stud bolt may be provided on base 11 and a female threaded portion may be formed in shaft member 22 that screws into this stud bolt, and that stud bolt may then be made to screw into said female threaded portion.

As is clear from FIGS. 4 and 5, insertion hole 22f and female threaded portion 22g are formed continuing concentrically to a depth beyond the bottom of the above-mentioned fitting hole 22e, and male threaded portion 28a of grease nipple 28 arranged so as to be inserted in said insertion hole 22f screws into said female threaded portion 22g. Lubricant feed hole 22h is formed so as to guide lubricant (such as oil or grease) supplied through said grease nipple 28 to track surface 22a. In addition to forming said lubricant feed hole 22h, as was previously described, connection hole 21d is formed in outer ring 21 that connects its track surface 21a with gear portion 21c. In this constitution, lubricant supplied to said lubricant feed hole 22h through the above-mentioned grease nipple 28 reaches track surface 22a of shaft member 22 and lubricates rollers 23, after which it reaches gear portion 21c after passing through the above-mentioned connection hole 21d of outer ring 21 to lubricate said gear portion 21c. Thus, since lubricant is adequately supplied to each of the required sites, together with maintaining a smooth operating state, maintenance is simple since lubricant reaches both rollers 23 and gear portion 21c only by being supplied to the above-mentioned lubricant feed hole 22h.

Figure 6:
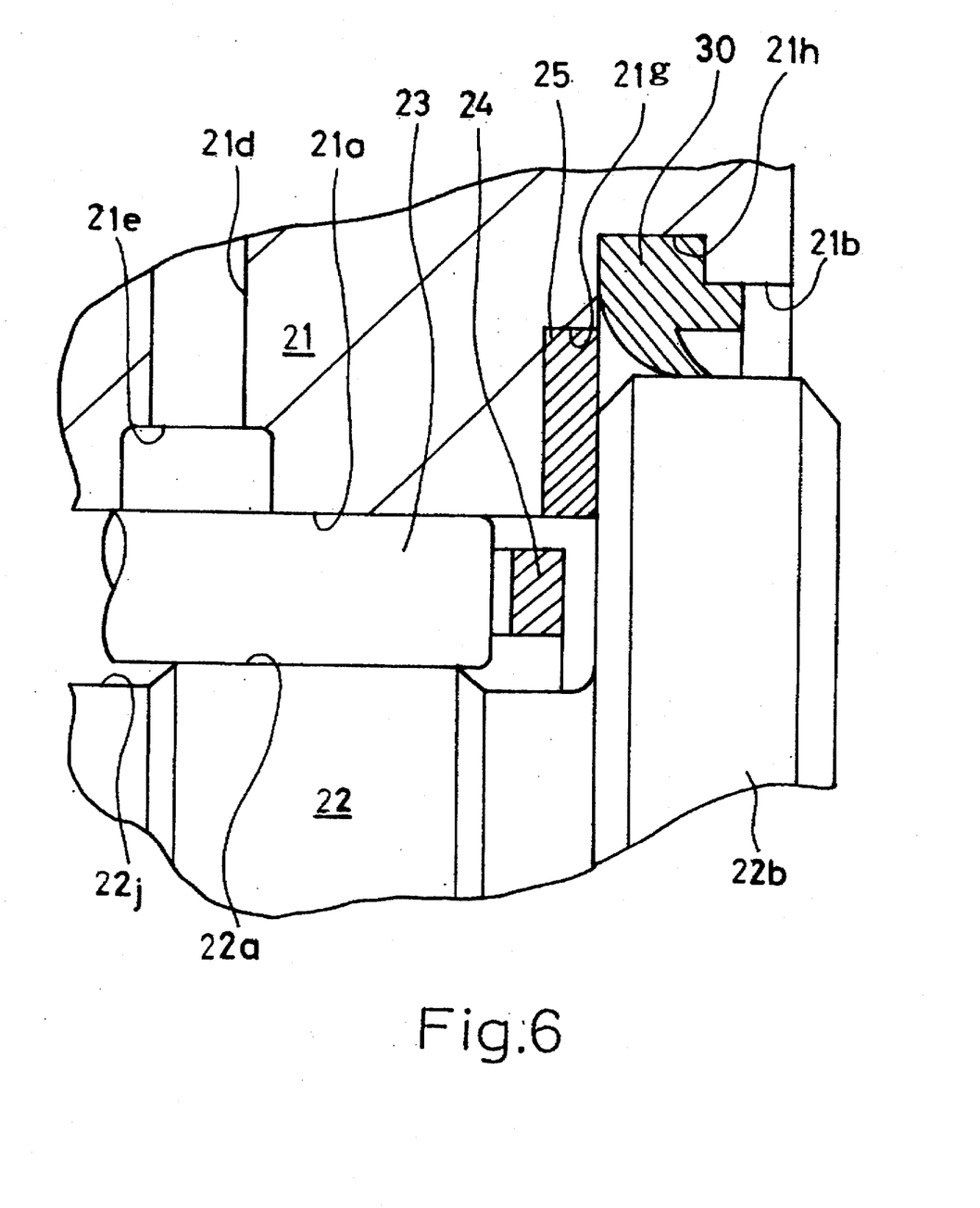
FIG. 6 is an enlarged view of portion II in FIG. 3.

However, as shown in FIGS. 3, 4 and 6, groove 22j for retaining lubricant is formed in track surface 22a of the above-mentioned shaft member 22 over its entire circumference. In addition, as was previously described, groove 21e for retention of lubricant is also similarly formed in track surface 21a of outer ring 21. As a result of providing these grooves 21e and 22j for retaining lubricant, lubricant that has been supplied is retained within these grooves, which together with enabling smooth operation to be maintained for a long time, eliminates the need to frequently replenish lubricant, thus resulting in easy maintenance. Furthermore, in addition to providing these grooves 21e and 22j in both outer ring 21 and shaft member 22 as in the present embodiment, grooves may be provided only in one of either outer ring 21 or shaft member 22.

The following provides an explanation of side plate 26 mentioned above.

As shown in FIG. 3, this side plate 26 is formed roughly into the shape of a ring and is press fit and attached to shaft member 22 so as to engage with the side end of outer ring 21 to operate in cooperation with flange portion 22b of said shaft member 22 to hold outer ring 21 on said shaft member 22.

Figure 7:
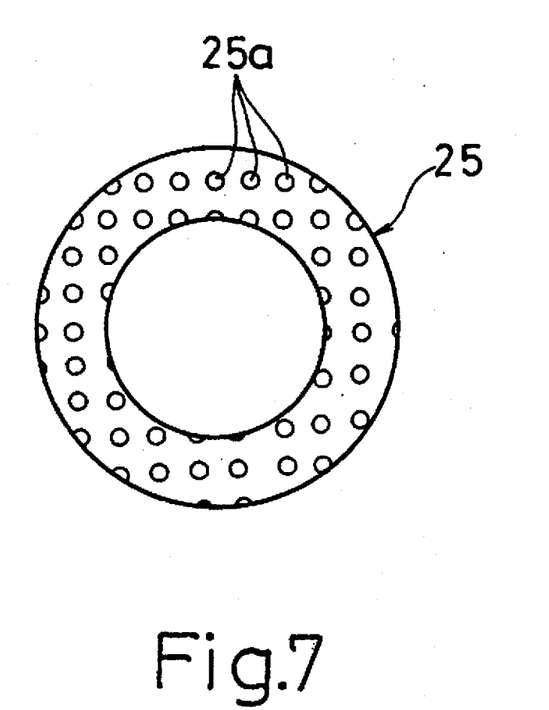
FIG. 7 is a front view of a thrust washer equipped on the stud type bearing with gear shown in FIG. 3.

As shown in FIGS. 3 and 6, the previously mentioned thrust washer 25 is juxtapositioned between one side of outer ring 21 and flange portion 22b of shaft member 22, and between the other side of outer ring 21 and the above-mentioned side plate 26. Said thrust washer 25 is formed into the shape of a flat ring, and is inserted while allowing to rotate freely into countersunk portion 21g (see FIG. 6) formed in both sides of outer ring 21. As shown in FIG. 7, a large number of spherical indentations 25a are formed in at least one of the primary surfaces on the top and bottom of this thrust washer 25 at equal intervals on its flat surface, and these indentations 25a act to retain lubricant.

As a result of providing the above-mentioned thrust washer 25, an axial load as well as a radial load can be borne, which together with extending the service life of the bearing, is able to accommodate rotation at high speeds. More specifically, in the case there is misalignment in said stud type bearing with gear, there is the risk of an axial load being generated on outer ring 21 caused by skew and so forth of rollers 23, and it is possible that this state may be augmented during high-speed rotation. The above-mentioned thrust washer 25 acts effectively with respect to this axial load.

In addition, although a heat-resistant sliding material that is self-lubricating is used for the above-mentioned thrust washer 25, in the present embodiment, it is formed with polyether ether ketone (PEEK), a type of crystalline, thermoplastic, high-performance engineering plastic. This polyether ether ketone has excellent heat resistance, toughness and chemical resistance, and is easily molded. In addition, polyacetal (POM) or polyamide (PA) can also be used instead of this polyether ether ketone. As a result of using these materials for the material of thrust washer 25, effects are demonstrated based on the above-mentioned various properties possessed by each of said materials, thereby contributing to resistance to bearing seizure with respect to heat resistance in particular.

Figure 8:
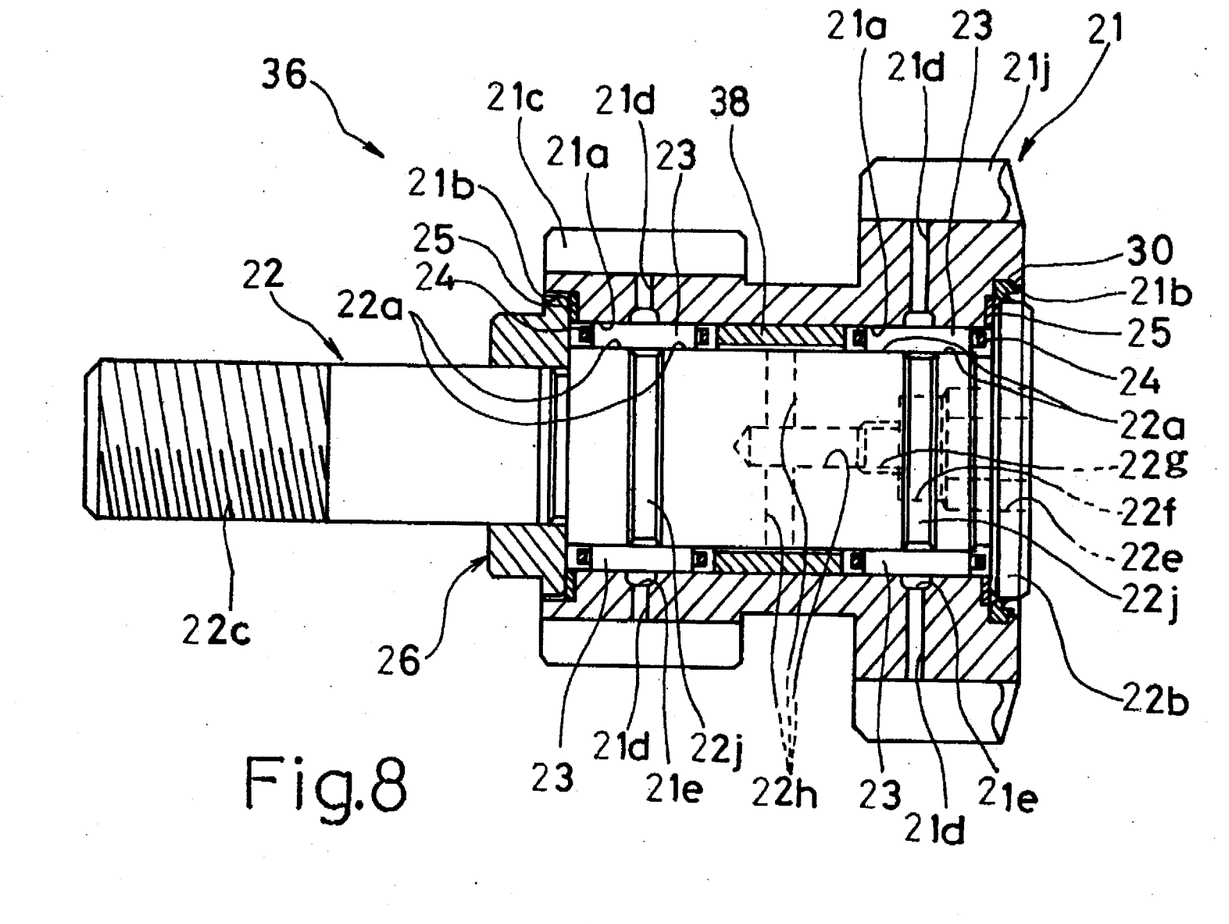
FIG. 8 is a cross-sectional view of a stud type bearing with gear as a second embodiment of the present invention.

In addition, as shown in FIGS. 3 and 8, the diameter of the above-mentioned thrust washer 25 is set to be roughly equal to the diameter of flange portion 22b of shaft member 22 and side plate 28. As a result, the surface area that engages with said flange portion 22b, side plate 26 and side of outer ring 21 is made to be large. Consequently, the axial load per unit surface area can be reduced, thus reducing sliding friction and decreasing wear. Furthermore, this, combined with the selection of the previously mentioned heat-resistance material results in improved resistance to seizure of the bearing.

However, as shown in FIGS. 3 and 8, seal member 30 made of synthetic resin or synthetic rubber and so forth is juxtapositioned between flange portion 22b of the above-mentioned shaft member 22 and side plate 26 and outer ring 21. More specifically, as shown in FIG. 6, said seal member 30 is fit into ring-shaped groove 21h formed in outer ring 21 so as to be located to the outside of the above-mentioned thrust washer 25, and its tongue piece makes sliding contact with the outer surfaces of the above-mentioned flange portion 22b and side plate 26. As a result of providing this seal member 30, entry of dust inside the bearing is prevented, and leakage of filled lubricant is inhibited.

Next, the following provides a brief description of the operation of idle gear 16 of the above-mentioned constitution.

In FIG. 2, torque from drive gear 13 is transmitted to outer ring 21 of idle gear 16 by means of driven gear 14 and transmission gear 15. Rotation of outer ring 21 is performed by rolling of each roller 23 held by cage 24 between track surfaces 21a and 22a of outer ring 21 and shaft member 22, respectively. Furthermore, lubricant supplied through lubricant feed hole 22h of shaft member 22 reaches rollers 23 between both of the above-mentioned track surfaces 21a and 22a causing rolling of rollers 23, namely smooth rotation of outer ring 21. Moreover, this lubricant flows out to gear portion 21c on the outside of the outer ring after passing through connection hole 21d formed in outer ring 21, which reduces the friction on each of the meshing surfaces of said gear portion 21c and the above-mentioned transmission gear 15 to facilitate smooth transmission of torque.

In addition, the load in the axial direction applied to outer ring 21 is smoothly received by thrust washer 25, and seizure is prevented due to the heat resistance of said thrust washer 25.

Continuing, the following provides an explanation of a stud type bearing with gear in the form of an idle gear as a second embodiment of the present invention based on FIG. 8. Furthermore, said idle gear 36 is composed in the same manner as idle gear 16 as a first embodiment of the present invention previously described with the exception of the parts explained below, and demonstrates similar action and effects. For this reason, an explanation of the entire constitution is omitted, and the explanation only covers those essential portions. In addition, in the explanation below, the same reference numerals are used for those constituent parts of the above-mentioned idle gear 36 that are identical or correspond to constituent parts of said idle gear 16 of the first embodiment. In addition, this applies similarly with respect to other embodiments described hereinafter.

As shown in the drawing, in idle gear 36, outer ring 21 has a plurality, and in this case two gear portions. Namely, the dimensions of outer ring 21 are larger in the axial direction, a first gear portion 21j is formed having a large diameter on the side of flange portion 22b of shaft member 22, while second gear portion 21c having a small diameter is formed on the opposite side.

On the other hand, shaft member 22 is formed to be relatively long with respect to outer ring 21 having a large dimensions of width as described above. Two rows of rolling elements in the form of rollers 23 are provided between both track surfaces 21a and 22a provided on outer ring 21 and shaft member 22 so as to respectively correspond to each of the above-mentioned gear portions 21c and 21j.

Cylindrical spacers 38 are juxtapositioned at the locations that are surrounded by both of the above-mentioned gear portions 21c and 21j between each track surface 21a and 22a of the above-mentioned outer ring 21 and shaft member 22, respectively. As a result, the interval between each of the two rows of rollers 23 is maintained by each cage 24.

Although lubricant feed hole 22h is provided from the free end on which flange portion 22b is formed to track surface 22a in shaft member 22, outlets are formed for said lubricant feed hole 22h at locations corresponding to the above-mentioned spacers 38. In this constitution, lubricant that passes through said lubricant feed hole 22h leaves said outlets and is uniformly allocated through the slight gap provided between spacers 38 and track surface 22a, enabling said lubricant to reach each of the two rows of rollers 23 and lubricate them. Accordingly, each of rows of rollers 23 as well as each track surface 22a and 21a respectively provided on shaft member 22 and outer ring 21 so as to allow rolling of said rollers 23 are effectively lubricated at all times, thereby maintaining a smooth operating state.

In each of the idle gears of the first and second embodiments described above, with respect to shaft member 22 with which they are equipped, the length of said shaft member 22, namely the shaft center that extends from free end to the stationary end, is in the form of a straight line. In contrast, a constitution may also be employed wherein the shaft center of the free end on which outer ring 21 is attached is eccentrically shifted in the radial direction with respect to the shaft center of the stationary end (not shown). According to this eccentric constitution, by slightly rotating shaft member 22 in the state in which said shaft member 22 is attached to base 11 (see FIG. 2), the position of outer ring 11 changes slightly in the radial direction. For this reason, the effect is obtained whereby, for example, the meshing state between a gear on the driving side (such as transmission gear 15 shown in FIG. 2) and the gear portion of this outer ring 21 can be finely adjusted and so forth by utilizing this eccentric constitution.

Furthermore, although rollers 23 are employed as rolling elements juxtapositioned between outer ring 21 and shaft member 22 in each of the embodiments previously described, a constitution may also be employed in which balls are used for said rolling elements. However, not only does the use of rollers 23 enable the apparatus to withstand heavy loads, but the diameter of shaft member 22 can be made larger, particularly by using needle-shaped rollers, and the thickness of outer ring 21 can be increased in the radial direction, thus contributing to increased mechanical strength. In addition, in the case of using balls for the rolling elements, although load capacity is inferior to that of rollers, dimensions in the axial direction of the entire bearing can be reduced.

In addition, in the stud type bearing with gear shown in each of the above-mentioned embodiments, although cage 24 is provided for maintaining rollers 23 at a prescribed interval from each other, a generic roller type may also be used that is not equipped with said cage. In addition, although lubricant feed hole 22h is provided from one end of the above-mentioned shaft member in each of the above-mentioned embodiments, it may be provided from the other end depending on the particular case.

In addition, although seal member 30 is provided in the stud type bearing with gear of each of the above-mentioned embodiments, it is also possible to employ a form that does not have said seal member.

In addition, although a single row of rollers 23 is provided in the stud type bearing with gear of each of the above-mentioned embodiments, a plurality of rows of said rollers 23 may also be used.

Continuing, the following provides an explanation of a stud type bearing with gear, a portion of the constitution of which differs from the stud type bearing with gear of each of the above-mentioned embodiments.

Figure 9:
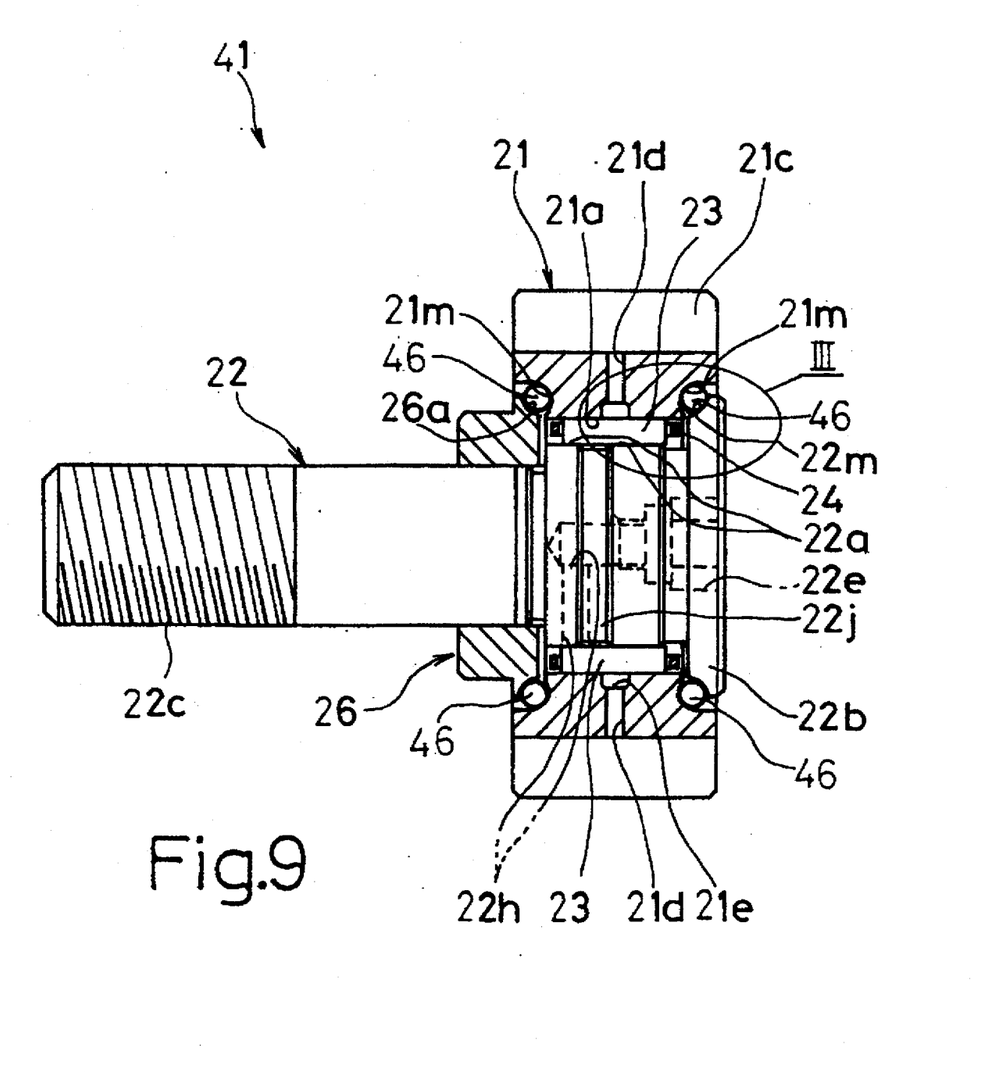
FIG. 9 is a cross-sectional view of a stud type bearing with gear as another embodiment of the present invention.
Figure 10:
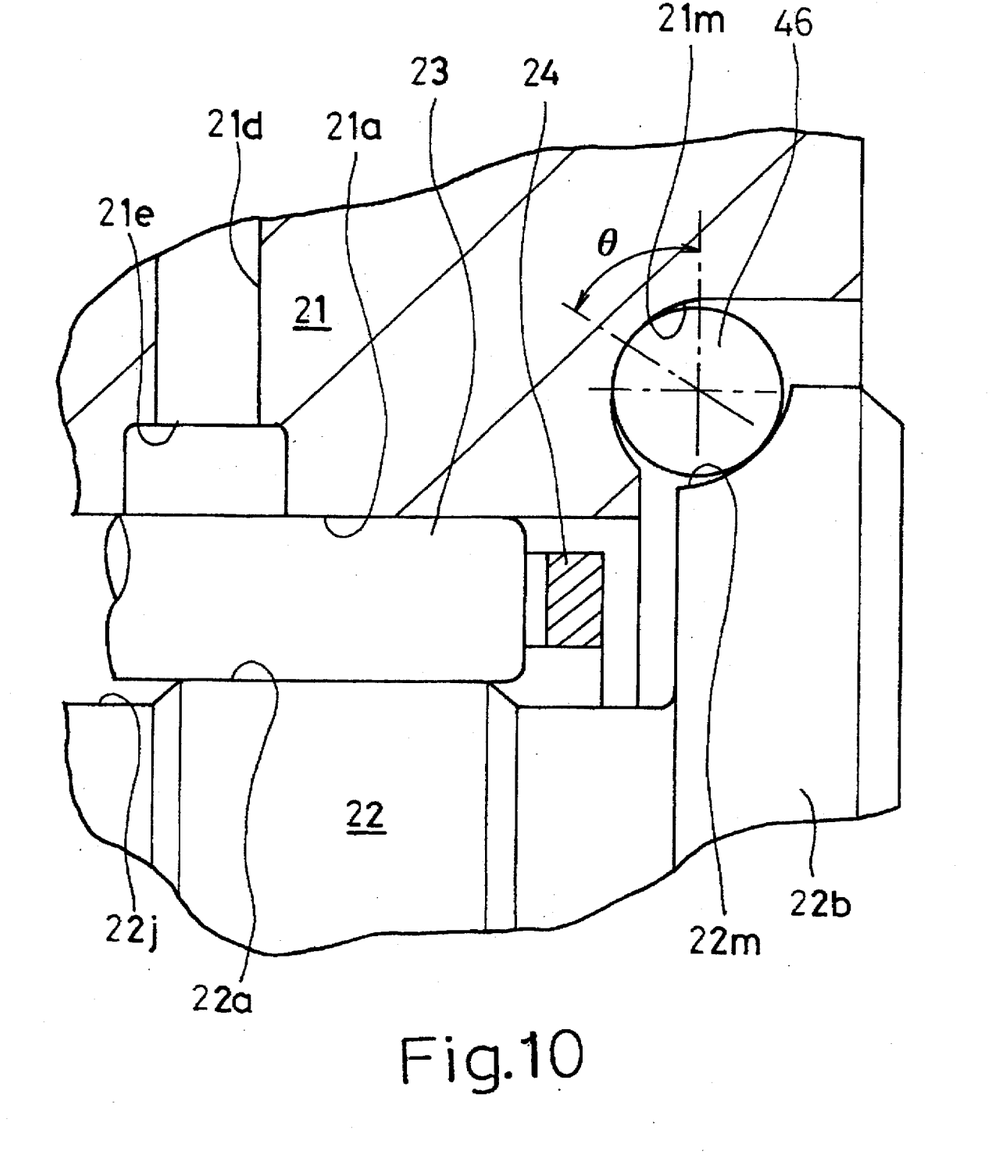
FIG. 10 is an enlarged view of portion III in FIG. 9.

First, an explanation is provided of a stud type bearing with gear as another embodiment of the present invention shown in FIGS. 9 and 10.

With respect to said stud type bearing with gear 41, a plurality of balls 46 are arranged in the circumferential direction juxtaposed between flange portion 22b of shaft member 22 and one side of outer ring 21 corresponding to it, and between the other side of outer ring 21 and side plate 26. Track surfaces 21m, 22m and 26a, over which said balls 46 roll, are formed in outer ring 21, flange portion 22b of shaft member 22 and side plate 26, respectively. The cross-sections of each of said track surfaces 21m, 22m and 26a are formed into the shape of arcs having a radius of curvature larger than the radius of balls 46, said track surfaces 21m, 22m and 26a making angular contact with said balls 46. More specifically, as shown in FIG. 10, contact angle θ is set to be within a range of 45° to 90°, and a constitution is employed that primarily receives a load in the axial direction.

According to said constitution, both a radial load and axial load are able to be received, and since the load capacity with respect to said axial load is relatively large, together with bearing life being extremely long, said bearing is able to accommodate rotation at high speeds.

Figure 11:
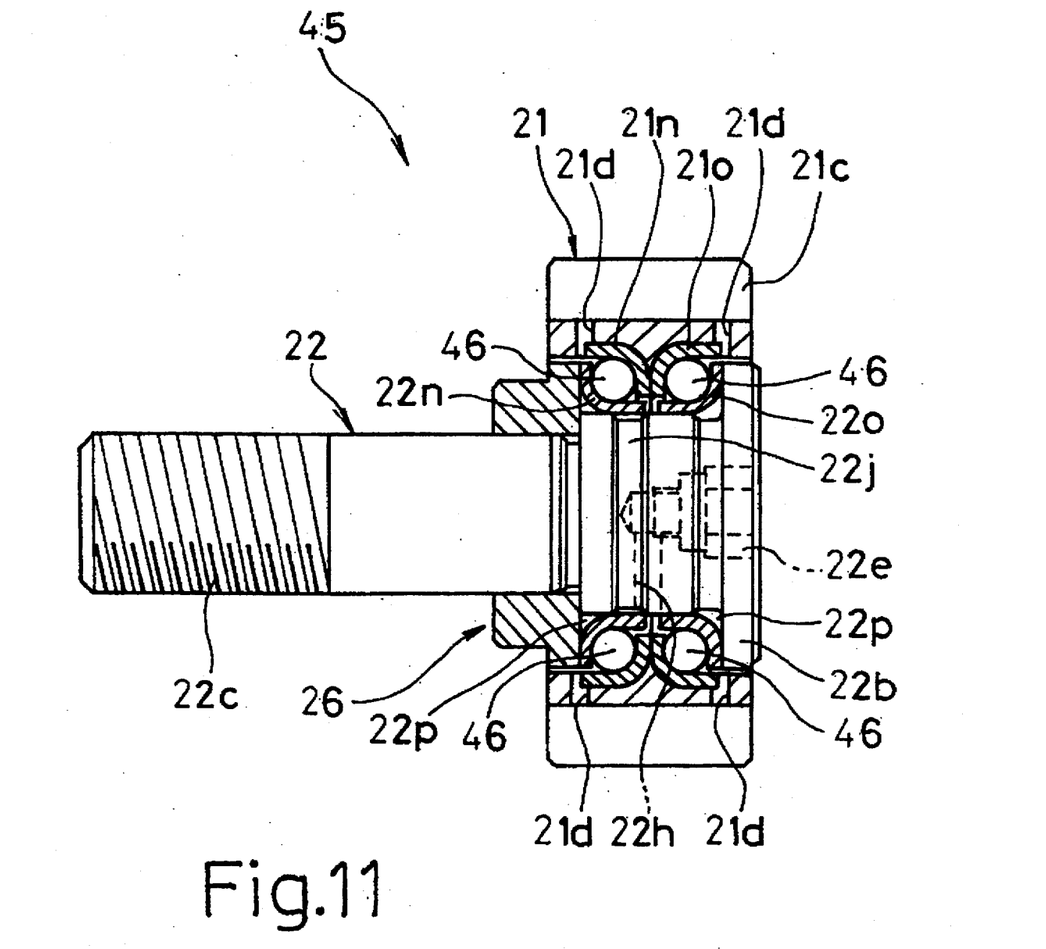
FIG. 11 is a cross-sectional view of a stud type bearing with gear as still another embodiment of the present invention.

Next, an explanation is provided of a stud type bearing with gear as still another embodiment of the present invention based on FIG. 11.

Said stud type bearing with gear 45 is equipped with rolling elements in the form of balls 46, and said balls 46 are arranged in two rows. The track portion provided on outer ring 21 and shaft member 22 over which said balls 46 are to roll is formed with thin-walled metal track members 21n, 21o, 22n and 22o that are separate from the other portion and have roughly L-shaped cross-section. Balls 46 and each track surface of said track members 21n, 21o, 22n and 22o make angular contact. The track surface portions of track members 22n and 22o provided on shaft member 22 are positioned separated by gap 22p with respect to the main portion of shaft members 22, namely the above-mentioned other portion, and are in a state of non-contact. Furthermore, although track members 21n and 21o equipped on outer ring 21 make contact with respect to the main portion of said outer ring 21, they also may be made to be in a non-contact state.

In said constitution, the amount of elastic displacement with respect to bearing load of the above-mentioned track members 22n and 22o, which are in a state of non-contact with respect to the main portion of the shaft member, is large. Accordingly, said constitution can be used under conditions of rough rotational precision.

Furthermore, the present invention is not limited to the constitutions of each of the previously described embodiments, but naturally a diverse range of constitutions can be realized by mutually combining or applying one portion each of the constitutions included in each of these embodiments.

As has been explained above, in the stud type bearing with gear according to the present invention, a constitution is employed wherein the outer ring on which a gear portion is formed is installed by means of rolling elements on the free end of a shaft member so as to be attached in a cantilever state. According to said constitution, together with dimensions particularly in the axial direction being able to be reduced to accomplish compact size, light weight is also achieved. In addition, in the case of incorporating said stud type bearing with gear in the form of, for example, an idle gear as a portion of an apparatus such as a machine tool, no other accessory parts such as ball bearings are necessary. Moreover, with respect to installation in the apparatus as well, since installation can be completed simply by screwing with a male threaded portion formed on the stationary end of the above-mentioned shaft member with the apparatus, handling is extremely simple. In addition, since said stud type bearing with gear demonstrates the function of idle gear and so forth by itself without requiring other accessory parts, manufacturing costs are less than constitutions of the prior art consisting of mutually assembling a plurality of parts.

Moreover, in the stud type bearing with gear according to the present invention, a thrust washer is juxtapositioned between a flange portion formed on the shaft member and one side of the outer ring corresponding to it, and between the other side of the outer ring and a side plate. Thus, said stud type bearing with gear is able to bear a radial load and axial load, which together with extending the life of the bearing, enables it to accommodate rotation at high speeds.

In addition, in the stud type bearing with gear according to the present invention, together with a lubricant feed hole being formed in the above-mentioned shaft member from one end to the track or its vicinity, a connection hole is formed in an outer ring that connects that track and gear portion. In this constitution, lubricant (oil or grease) supplied to said lubricant feed hole reaches the track of the shaft member and lubricates rolling elements, after which it reaches the gear portion by passing through the above-mentioned connection hole to lubricate said gear portion. Since lubricant is adequately supplied to each required part in this manner, together with maintaining a smooth operating state, maintenance is simple since lubricant reaches both the rolling elements and gear portion simply by being supplied to the above-mentioned lubricant feed hole.

In addition, in a stud type bearing with gear according to the present invention wherein the outer ring has a plurality of gear portions, spacers are juxtapositioned between each track of said outer ring and shaft member at locations surrounded by said plurality of gear portions, and outlets of the above-mentioned lubricant feed hole are formed at locations corresponding to said spacers. In this constitution, lubricant that passes through the above-mentioned lubricant feed hole comes out of said outlets and is equally allocated by said spacers to reach rolling elements provided in a plurality of rows. Accordingly, each row of rolling elements as well as each track respectively provided on the shaft member and outer ring over which these rolling elements roll are effectively lubricated at all times, thereby maintaining a smooth operating state.

In addition, in the stud type bearing with gear according to the present invention, a groove is formed over the entire circumference in at least one of either the outer ring or each track of shaft member. Thus, lubricant that has been supplied is retained in this groove, which together with enabling lubricant action to be maintained for a long time, also results in easy maintenance since replenishment of lubricant is not required to be performed that frequently.

Next, in the stud type bearing with gear according to the present invention, a seal member is juxtapositioned between the flange portion of a shaft member and a side plate and outer ring. As a result, entry of dust inside the bearing is prevented, and leakage of filled lubricant is inhibited.

Moreover, in the stud type bearing with gear according to the present invention, a male threaded portion or female threaded portion is formed on the stationary end of the above-mentioned shaft member. Accordingly, in the case of installing said stud type bearing with gear as a part of an apparatus such as a machine tool, attachment is completed simply by screwing with said threaded portion on the body of the apparatus, thus enabling attachment work to be performed both simply and rapidly.

In addition, in the stud type bearing with gear according to the present invention, a fitting portion is formed on the free end of a shaft member to which a fastening tool such as a hexagon wrench or screwdriver is able to fit. Thus, special tools or jigs are not required to be made available when fastening said stud type bearing with gear as a part of the above-mentioned apparatus, and attachment is able to be performed using only ordinary fastening tools like those previously described.

In addition, in the stud type bearing with gear according to the present invention, the previously described thrust washer is formed using polyether ether ketone, polyacetal or polyamide as the material. In addition to these materials having properties that facilitate easy molding, they also have excellent heat resistance, chemical resistance and toughness. As a result of using these materials, effects are demonstrated based on these various properties, and contribute to resistance to bearing seizure with respect to heat resistance in particular.

Moreover, in the stud type bearing with gear according to the present invention, the shaft center of the free end of side to which the outer ring is attached is eccentrically shifted in the radial direction with respect to the shaft center of the stationary side. According to this constitution, by slightly rotating the shaft member in the state in which the stud type bearing with gear is incorporated in an apparatus, since the position of the outer ring changes slightly in the radial direction, the effect is obtained whereby, for example, the meshing state between a gear on the driving side and the gear portion of this outer ring can be finely adjusted by utilizing this eccentric constitution.

In addition, in the stud type bearing with gear according to the present invention, rollers are used for the rolling elements. As a result of using rollers, together with being able to withstand heavy loads, the diameter of the shaft member can be made larger, particularly by using needle-shaped rollers, and the thickness of the outer ring can be increased in the radial direction, thus contributing to increased mechanical strength.

On the other hand, in the stud type bearing with gear according to the present invention, balls are also used as rolling elements. In the case of using balls for the rolling elements, although load capacity is inferior to that of rollers, dimensions in the axial direction of the entire bearing can be reduced.

In addition, in the stud type bearing with gear according to the present invention, a plurality of balls are juxtapositioned between one side of the above-mentioned outer ring and a flange portion of the shaft member, and between the other side of the outer ring and a side plate, and angular contact is made between said outer ring, the track surfaces of flange portion and side plate, and said balls. Thus, both a radial load and axial load are able to be received, and since the load capacity with respect to said axial load is relatively large, together with bearing life being extremely long, said bearing is able to accommodate rotation at high speeds.

Moreover, in the stud type bearing with gear according to the present invention, the rolling elements juxtapositioned between the outer ring and shaft member are balls, the track portion of the outer ring and shaft member is formed with thin-walled metal track members that are separate from the other portion and have roughly L-shaped cross-section, and said balls and track surface of said track members make angular contact. The track surface portions of the track members provided on the outer ring and/or shaft member are in a state of non-contact with the above-mentioned other portion of the outer ring and/or shaft member. According to said constitution, the amount of elastic displacement with respect to bearing load of the track portion is large, thus enabling said constitution to be used under conditions of rough rotational precision.

What is claimed is:

1. A stud type bearing with gear equipped with an outer ring provided with a track on the inside and having a gear portion formed on the outside, a shaft member inserted into said outer ring, having a flange portion that engages with one side of said outer ring formed on one end, and a track formed in the vicinity of said one end so as to correspond with the track of said outer ring, a plurality of rolling elements arranged between said tracks that roll accompanying rotation of said outer ring, and a side plate fit on the outside of said shaft member and provided so as to engage with the other side of said outer ring that operates in concert with said flange portion and holds said outer ring on said shaft member, wherein a lubricant feed hole is formed in said shaft member from one end of said shaft member to a track or its vicinity, and a connection hole is formed in said outer ring that connects that track and said gear portion.

2. A stud type bearing with gear equipped with an outer ring provided with a track on the inside and having a gear portion formed on the outside, a shaft member inserted into said outer ring, having a flange portion that engages with one side of said outer ring formed on one end, and a track formed in the vicinity of said one end so as to correspond with the track of said outer ring, a plurality of rolling elements arranged between said tracks that roll accompanying rotation of said outer ring, and a side plate fit on the outside of said shaft member and provided so as to engage with the other side of said outer ring that operates in concert with said flange portion and holds said outer ring on said shaft member, wherein a groove extending over the entire circumference is formed in at least one of either of the tracks of said outer ring and shaft member.

3. A stud type bearing with gear equipped with an outer ring provided with a track on the inside and having a gear portion formed on the outside, a shaft member inserted into said outer ring, having a flange portion that engages with one side of said outer ring formed on one end, and a track formed in the vicinity of said one end so as to correspond with the track of said outer ring, a plurality of rolling elements arranged between said tracks that roll accompanying rotation of said outer ring, and a side plate fit on the outside of said shaft member and provided so as to engage with the other side of said outer ring that operates in concert with said flange portion and holds said outer ring on said shaft member, wherein a threaded portion is formed in said shaft member in the other end with respect to said one end, wherein a fitting portion into which a fastening tool is able to fit is formed on said one end of said shaft member.

4. The stud type bearing with gear as set forth in claim 3 wherein a seal member is juxtapositioned between said flange portion, side plate and said outer ring.

5. The stud type bearing with gear as set forth in claim 3 wherein a thrust washer is juxtapositioned between one side of said outer ring and said flange portion, and between the other side of said outer ring and said side plate.

6. The stud type bearing with gear as set forth in claim 5 wherein said thrust washer is formed from polyether ether ketone (PEEK), polyacetal (POM) or polyamide (PA).

7. The stud type bearing with gear as set forth in claim 3 wherein said rolling elements are balls.

8. The stud type bearing with gear as set forth in claim 3 wherein said rolling elements are rollers.

9. A stud type bearing with gear equipped with an outer ring provided with a track on the inside and having a gear portion formed on the outside, a shaft member inserted into said outer ring, having flange portion on one side of said outer ring formed on one end, and a track formed in the vicinity of said one end so as to correspond with the track of said outer ring, a plurality of rolling elements arranged between said tracks that roll accompanying rotation of said outer ring, and a side plate fit on the outside of said shaft member and provided on the other side of said outer ring that operates in concert with said flange portion and holds said outer ring on said shaft member, wherein a threaded portion is formed in said shaft member in the other end with respect to said one end, and wherein a fitting portion into which a fastening tool is able to fit is formed on said one end of said shaft member.

10. The stud type bearing with gear as recited in claim 8, wherein a lubricant feed hole is formed in said shaft member from one end of said shaft member to a track or its vicinity, and a connection hole is formed in said outer ring that connects that track and said gear portion.

11. The stud type bearing with gear as recited in claim 10, wherein the outer ring has a plurality of gear portions, and further comprising spacers juxtapositioned between each track of said outer ring and shaft member at locations surrounded by respective ones of said plurality of gear portions, wherein outlets of said lubricant feed hole are formed at locations corresponding to said spacers.

12. The stud type bearing with gear as recited in claim 8, wherein a plurality of balls are juxtapositioned between one side of said outer ring and said flange portion, and between the other side of said outer ring and said side plate, said balls making angular contact with the track surfaces of said outer ring, flange portion and side plate.

13. The stud type bearing with gear as recited in claim 8, wherein said rolling elements are balls, the tracks on the outer ring and the shaft member comprise thin-walled metal track members having roughly L-shaped cross-sections, said balls are held between respective ones of the track members on the outer ring and the track members on the shaft member, and said balls and said track members make angular contact.

14. The stud type bearing with gear as recited in claim 9, wherein the outer ring has a plurality of gear portions, and the rolling elements are arranged corresponding to each one of the plurality of gear portions.

15. A stud type bearing with gear equipped with an outer ring provided with a track on the inside and having a gear portion formed on the outside, a shaft member inserted into said outer ring, having a flange portion that engages with one side of said outer ring formed on one end, and a track formed in the vicinity of said one end so as to correspond with the track of said outer ring, a plurality of rolling elements arranged between said tracks that roll accompanying rotation of said outer ring, and a side plate fit on the outside of said shaft member and provided so as to engage with the other side of said outer ring that operates in concert with said flange portion and holds said outer ring on said shaft member, wherein the shaft center of said one end of said shaft member on which said outer ring is attached is eccentrically shifted in the radial direction with respect to the shaft center of the other end.

* * * * *